United States Patent
Mahadevan et al.

(10) Patent No.: US 9,391,777 B2
(45) Date of Patent: Jul. 12, 2016

(54) SYSTEM AND METHOD FOR PERFORMING KEY RESOLUTION OVER A CONTENT CENTRIC NETWORK

(71) Applicant: Palo Alto Research Center Incorporated, Palo Alto, CA (US)

(72) Inventors: Priya Mahadevan, Sunnyvale, CA (US); Ersin Uzun, Campbell, CA (US); Spencer Sevilla, Saratoga, CA (US); Jose J. Garcia-Luna-Aceves, San Mateo, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 64 days.

(21) Appl. No.: 14/461,258

(22) Filed: Aug. 15, 2014

(65) Prior Publication Data

US 2016/0050068 A1 Feb. 18, 2016

(51) Int. Cl.
 *H04L 9/32* (2006.01)
 *H04L 9/30* (2006.01)
 *G06F 21/60* (2013.01)
 *H04L 29/06* (2006.01)

(52) U.S. Cl.
 CPC .............. *H04L 9/321* (2013.01); *G06F 21/602* (2013.01); *H04L 9/30* (2013.01); *H04L 9/3263* (2013.01); *H04L 63/06* (2013.01); *H04L 63/0823* (2013.01)

(58) Field of Classification Search
 CPC ......... H04L 9/321; H04L 9/30; H04L 9/3263; H04L 63/0823; H04L 63/06; G06F 21/602
 See application file for complete search history.

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| DE | 1720277 A1 | 6/1967 |
|---|---|---|
| DE | 19620817 A1 | 11/1997 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Joseph P Hirl
*Assistant Examiner* — J. Brant Murphy
(74) *Attorney, Agent, or Firm* — Shun Yao; Park, Vaughan, Fleming & Dowler LLP

(57) ABSTRACT

A key-resolution service (KRS) can facilitate a client device in verifying that Content Objects are signed by a trusted entity. During operation, the KRS service can receive an Interest that includes a KRS query for a content name that is to be resolved. The KRS service obtains the content name from the Interest, and obtains a KRS record that includes security information for the content name or a prefix of the content name. The KRS service then returns a Content Object whose payload includes the KRS record to satisfy the first Interest. The client device can query the KRS service to obtain a trusted key associated with at least a name prefix of the Content Object, and if necessary, can disseminate Interests to obtain keys that complete a chain of trust between the trusted key and a key that is used to authenticate the Content Object.

20 Claims, 12 Drawing Sheets

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 9,253,087 B2 * | 2/2016 | Zhang ..................... H04L 45/74 |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |

(56) References Cited

U.S. PATENT DOCUMENTS

| | | |
|---|---|---|
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1* | 11/2009 | Jacobson ............ G06F 15/173 726/22 |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Mera |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1* | 8/2010 | Jacobson ............ H04L 45/7457 370/392 |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1* | 9/2012 | Kim ..................... H04L 9/008 713/153 |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |

(56) References Cited

U.S. PATENT DOCUMENTS

| | | |
|---|---|---|
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1* | 8/2013 | Qian ............... H04L 67/327 709/241 |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1* | 9/2014 | Zhang ............... H04L 9/3268 713/158 |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1* | 1/2015 | Franck ............... H04L 63/04 713/171 |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network &oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

B. Lynn$2E.

(56) References Cited

OTHER PUBLICATIONS

Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh, C. Gentry, and B. Waters, 'Collusi.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
H. Xiong, X. Zhang, W. Zhu, and D. Yao. CloudSeal: End-to$2.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Science vol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.

(56) References Cited

OTHER PUBLICATIONS

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. Inc 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J.J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).

(56) References Cited

OTHER PUBLICATIONS

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

Vutukury, Srinivas, and J.J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014}: 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

D. Trossen and G. Parisis, "Designing and realizing and information-centric Internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

J. Lotspiech, S. Nusser, and F. Pestoni. Anonymous Trust: Digital Rights Management using Broadcast Encryption. Proceedings of the IEEE 92.6 (2004).

Kaya et al., "A Low Power Lookup Technique for Multi-Hashing Network Applications", 2006 IEEE Computer Society Annual Symposium on Emerging VLSI Technologies and Architectures, Mar. 2006.

S. Kamara and K. Lauter. Cryptographic Cloud Storage. Financial Cryptography and Data Security. Springer Berlin Heidelberg (2010). RTMP (2009). Available online at http://wwwimages.adobe.com/www.adobe.com/content/dam/Adobe/en/devnet/rtmp/ pdf/rtmp specification 1.0.pdf.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

\* cited by examiner

SYSTEM AND METHOD FOR PERFORMING KEY RESOLUTION OVER A CONTENT CENTRIC NETWORK

STATEMENT OF GOVERNMENT-FUNDED RESEARCH

This invention was made with U.S. Government support under Contract No. G015.3707, awarded by the National Science Foundation (NSF) Future Internet Architectures (FIA) program, Named Data Networking (NDN) project. The U.S. Government has certain rights in this invention.

BACKGROUND

1. Field

This disclosure is generally related to securing digital content. More specifically, this disclosure is related to a Key Resolution Service that resolves keys for Content Objects.

2. Related Art

Advancements in computing and networking technologies have made it possible for people to incorporate electronics into their daily lives. People typically use computers to perform online banking, to interact with others, and to search for and consume information published by others. More recently, advancements in machine-to-machine communications has made it possible for people's appliances to automate tasks for their users. For example, some digital thermostats can interact with a central controller that can generate an optimized schedule for the thermostat, and which configures the thermostat to use this schedule to control a heating, ventilation, and air conditioning (HVAC) unit.

The convenience provided by these advancements is built upon the underlying networking protocols used to exchange communication packets between user's devices and with application servers. In many cases, these communication packets can include sensitive information about the users and their daily habits; information that the users may not intend to share with the general public. Hence, in the Web today, application developers typically use Hypertext Transfer Protocol Secure (HTTPS) as the primary protocol to provide secure content delivery.

However, HTTPS requires the content server to provide to a client a certificate signed by a trusted Certificate Authority (CA). The client verifies the certificate through a Public Key Infrastructure (PKI), and uses the certificate to generate a symmetric key. The client then uses this key to encrypt and decrypt all information for the duration of the communication session with the content server. Unfortunately, there exists many CAs that can sign digital certificates, and it's up to the user to decide which CAs are trustworthy. Typically, a user needs to specify which CAs are trustworthy, and uses these CAs as "root" CAs. Other CAs function as intermediate CAs when they are trusted by the root CA directly, or indirectly via a chain of trust.

Recent developments in computer networking include Content Centric Networking (CCN), which allows clients to obtain data by disseminating an "Interest" that specifies a unique name for the data. Any peer CCN device that is storing this data can provide the data to the client, regardless of where this peer CCN device is located. However, allowing any peer network device to satisfy an Interest for a piece of data from a trusted publisher makes it difficult to ensure the data has actually originated from the trusted publisher. For example, HTTPS uses digital certificates to map a server to a person or organization that publishes data from this server. The client device uses HTTPS and the CAs to verify that they received the data from the organization they expect the data to arrive from. Unfortunately, a CCN client device cannot use HTTPS to verify that a piece of data originated from a given publisher when the client obtains this data from a different source, such as from a peer CCN device that has obtained and cached the same data in the past.

SUMMARY

One embodiment provides a key-resolution service (KRS) that facilitates a client device in verifying that Content Objects are signed by a trusted entity. The KRS service can include a set of local KRS services that receive Interest messages from clients, a set of authoritative KRS services that each maintain security information (using KRS records) for one or more KRS zones (e.g., name prefixes), and a root KRS service that maintains security information for root name prefixes. During operation, a local KRS service can receive, over a Content Centric Network (CCN), an Interest message with a name that includes a routable prefix associated with the local KRS service, and that includes a KRS query for a content name that is to be resolved. The Interest can include the KRS query appended to the routable prefix in the Interest's name, or can include the KRS query in a payload. The KRS service processes the Interest message to obtain a KRS record for the content name. The KRS record includes security information for the content name or a prefix of the content name. The KRS service generates and returns a Content Object whose payload includes the KRS record to satisfy the Interest message.

In some embodiments, the KRS record includes a name or name prefix for which the KRS record resolves security information, a payload comprising security information for the name or name prefix, and/or security information that is used to authenticate the KRS record.

In some embodiments, the underlying CCN nodes forward the client device's Interest message to a local KRS service associated with the Interest message's routable prefix. The local KRS service can obtain the KRS record by performing a longest-prefix-matching lookup in a next-hop table, using the content name as input, to obtain another routable prefix for a key-resolution zone associated with the content name or a prefix of the content name. The local KRS service then generates another Interest message whose name includes the routable prefix to the KRS zone, and includes the query for the content name in the name or a payload of the second Interest. The local KRS service disseminates this Interest message over the CCN network to query an authoritative KRS server for a KRS record.

In some embodiments, a respective entry of the next-hop table includes a name or name prefix, a routable prefix for a key-resolution zone mapped to the name or name prefix, and/or a public key for a key-resolution service associated with the key-resolution zone.

In some embodiments, a KRS service (e.g., a local KRS service or an authoritative KRS service) can disseminate an Interest to query a target key-resolution zone. If a service at the target key-resolution zone does not include a KRS record for the query, the KRS service can receive a Content Object that includes a routable prefix for another key-resolution zone. The KRS service can query the new key-resolution zone by generating another Interest message whose name includes the routable prefix for the new key-resolution zone, and that includes the query for the content name in the name or a payload of the Interest. The KRS service can disseminate this Interest to receive a Content Object that includes the KRS record.

In some variations to this embodiment, the KRS service can update the next-hop table to include an entry that maps the content name to the routable prefix for the second key-resolution zone.

In some variations to this embodiment, the KRS service can receive a Content Object that includes the KRS record, and caches the KRS record in a KRS record repository.

In some embodiments, the authoritative KRS service can obtain the KRS record by performing a longest-prefix-matching lookup in a KRS record repository, using the content name as input. This KRS record includes the security information associated with at least a prefix of the content name.

In some embodiments, the security information for the content name or a prefix of the content name in the KRS record can include a public key, a public key certificate, a certificate chain, a cryptographic digest of a Content Object, and/or a cryptographic digest of a content object, signed by the Content Object's producer or a trusted entity.

One embodiment provides a client device that uses a key from the KRS service to verify that a Content Object is signed by a trusted entity. During operation, the client device can query the KRS service to obtain a trusted key for a Content Object. The client device can also obtain the Content Object itself over CCN, and analyzes the Content Object to obtain a key locator for a key that is used to authenticate the Content Object. The client device then determines whether a chain of trust exists between the trusted key and a key associated with the Content Object's key locator. The client device determines that the Content Object is valid if the chain of trust exists.

In some embodiments, while determining that the chain of trust exists, the client device verifies that the key locator references the trusted key from the key-resolution server.

In some embodiments, while determining that the chain of trust exists, the client device can disseminate an Interest for an intermediate key signed by the trusted key, and that links the trusted key toward the Content Object's key.

In some variations to these embodiments, when the client device determines that the key locator does not reference a current intermediate key at the end of a current chain of trust from the trusted key, the client device can extend the chain of trust toward the Content Object's key by disseminating an Interest for another intermediate key signed by the current intermediate key, and that links the current intermediate key toward the Content Object's key.

In some embodiments, the client device can determine that the chain of trust exists by obtaining a target key over CCN, for example, by disseminating an Interest whose name includes the key locator.

In some variations to these embodiments, when the client device determines that the trusted key does not sign a current intermediate key at the start of a current chain of trust to the Content Object's key, the client device can extend the chain of trust toward the trusted key by iteratively disseminating an Interest for another intermediate key that is used to authenticate the current intermediate key at the start of the current chain of trust.

BRIEF DESCRIPTION OF THE FIGURES

In the figures, like reference numerals refer to the same figure elements.

DETAILED DESCRIPTION

Figure 1A:
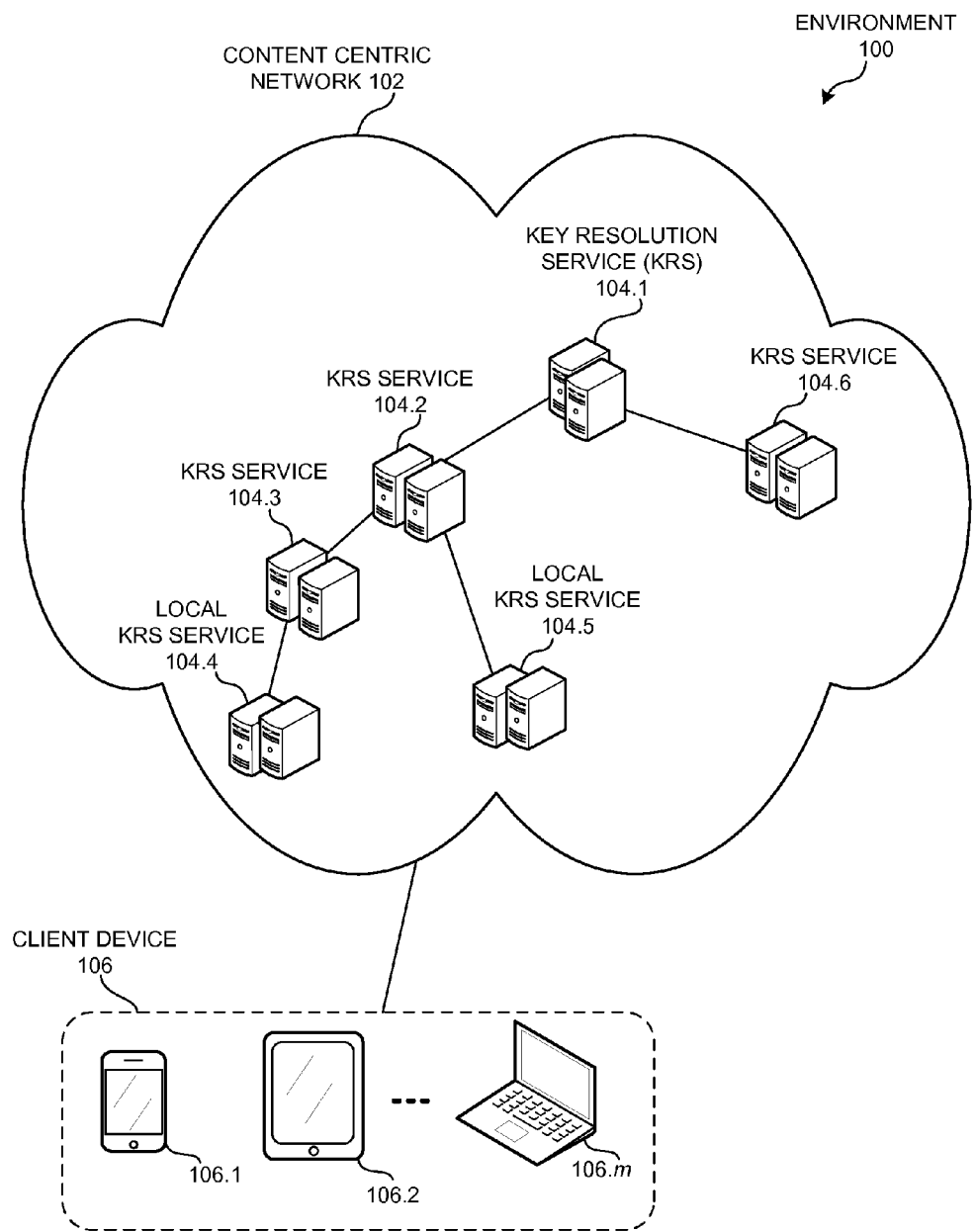
FIG. 1A illustrates an exemplary computing environment that facilitates resolving keys for Content Objects in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a Key Resolution Service (KRS) that solves the problem of providing a client device with security information that can be used to verify a given data object. This KRS service is deployed and executed across a multitude of computing devices (e.g., servers) organized into various KRS "zones," such that a KRS service can exist for each zone. Each KRS service can store security information for a collection of CCN names, and can use a next-hop table to map a content name to another KRS service that may store security information for the content name.

For example, Content Centric Networks (CCN) are designed around the concept that users are interested in content itself, not where the data comes from. This allows a client to obtain content from any source, such as the publisher, a nearby cache, or other users that previously requested a particular Content Object. Because of this architectural characteristic, security in CCN is designed to secure the Content Object itself, rather than the end-to-end channel over which the Content Object is transmitted.

In some embodiments, a client can disseminate an Interest that queries the KRS service for security information associated with the Content Object's name or name prefix, and can use this security information to verify the Content Object. Securing a Content Object can be performed using self-certifying names, where the name of the Content Object is bound to its security information. Securing a Content Object can also be performed by including security information with the Content Object, which the client can use to verify that the Content Object's data is correct and has not been tampered with. This security information itself can take several forms, such as a public key, a public key certificate, a signed certificate chain, a cryptographic digest of a Content Object, a cryptographic digest of a content object that is signed by the Content Object's producer or a trusted entity, and/or a simple hash of the Content Object's payload.

Hence, the KRS service maps a CCN name or name prefix (e.g., "/parc/jj/paper1.pdf") to security information for the name. A client can query the KRS service for the security information before issuing an Interest for the Content Object, which allows the client to verify the authenticity of the Content Object when it is received. In some embodiments, the KRS service is designed as a distributed service that runs on top of CCN using Interest and Content Objects, and does not require changes to the CCN architecture or the CCN protocol.

The KRS service implements a hierarchical trust model that enables clients to verify both the integrity of the security information received with a Content Object, as well as the integrity of the security information returned by the KRS service. The KRS service can store and transport the security information using KRS records are themselves secure to prevent attackers from providing false KRS records along with malicious Content Objects. This way, when a client queries the KRS service and receives a response, the client can independently verify the received KRS record. Moreover, the KRS service is flexible enough to support a wide range of security models, since different publishers and organizations may employ dramatically different security techniques.

FIG. 1 illustrates an exemplary computing environment 100 that facilitates resolving keys for Content Objects in accordance with an embodiment. Specifically, environment 100 includes a Key Resolution Service (KRS) 104 that is organized into a set of KRS zones, such that each zone manages security information records (KRS records) for various name prefixes. KRS service 104 includes a root zone (e.g., root KRS service 104.1), a local KRS service that processes requests from clients (e.g., one or more servers for KRS services 104.4 and 104.5), and a set of authoritative KRS services that maintain KRS records for various name prefixes. In some embodiments, a respective authoritative KRS service is deployed across a collection of computers (e.g., a set of distributed servers) associated with a KRS zone.

In some embodiments, the root KRS service can maintain a next-hop table that maps a content name to a globally routable name for a KRS zone associated with the content name. Each entry of the next-hop table stores the name and public key of the KRS service that either stores the KRS record for that content name, or that knows the name of the next-hop server or next-hop KRS zone to whom the KRS request can be forwarded.

A local or authoritative KRS service can also maintain a next-hop table, which maps a content name to a name and public key of another KRS service that can be used to forward a KRS query. This way, a KRS service that does not store a KRS record for a content name can search through the next-hop table for another KRS service that stores the KRS record, or that knows the name of yet another KRS service to which the KRS request can be forwarded. If the KRS service does not know of another KRS service for the content name (e.g., if the next-hop table does not include an entry for the content name), the KRS service can forward the KRS query to the root KRS service. The root KRS service can return a globally routable name of a KRS zone for the content name.

Computing environment 100 can also include a client device 106, such as a smartphone 106.1, a tablet computer 106.2, and/or a personal computing device 106.*m* (e.g., a laptop). Client device 106 can query KRS service 104 to obtain security information for a query prefix. KRS service 104 can implement a key-value store that maps the name or name-prefix to its corresponding security information. KRS service 104 can return a response that specifies the security information, or a response which affirms that no such information exists for the query prefix.

Client device 106 can perform the KRS operations underneath individual CCN applications. When an application running on client device 106 issues a request for a Content Object, client device 106 can query KRS service 104 to resolve whichever security information is appropriate, and can then use this information when constructing the Interest for obtaining the Content Object.

In some embodiments, KRS service 104 can support local client discovery that allows client device 106 to communicate with a nearby server of KRS service 104. For example, when client device 106 joins a Wi-Fi network at a coffee shop, client device 106 may not have a-priori information regarding the network topology. Local KRS services 104.4 and 104.5 support local client discovery by advertising the CCN prefix "/krs." This enables client device 106 to take advantage of CCN's nearest-replica-routing to route an Interest with a KRS query to the closest local KRS service without a priori knowledge of the local CCN network topology. When client device 106 wishes to use KRS service 104 to resolve the security information for a content name, client device 106 can create a KRS query by creating an Interest that includes a routable prefix to the KRS service (e.g., the prefix "/krs"), and includes the query for the content name. Client device 106 can request for security information for the name "/parc/papers/krs.pdf" by disseminating an Interest "/krs/q=/parc/papers/krs.pdf." Alternatively, client device 106 can create the Interest to include the query within a payload of the Interest.

When a local KRS service receives an Interest from client device 106, the local KRS service can store the received Interest and obtains the KRS query from the Interest. The local KRS service then performs a longest-prefix-matching lookup through its next-hop table using the KRS query's content name as input to determine a routable prefix for forwarding this request, and creates a recursive Interest for the request. The local KRS service disseminates this recursive Interest over CCN to receive a response from an authoritative KRS service. The local KRS service may receive a Content Object that encapsulates a KRS record that includes the security information for the content name, that includes a routable prefix to another KRS zone for the content name, or that encapsulates a KRS record which specifies that security information does not exist for the content name.

Whenever the local KRS service receives a routable prefix to another KRS zone, the local KRS service generates and disseminates another Interest to the other KRS zone. The local KRS service can generate an Interest that includes the routable prefix to the other KRS service in the Interest's name, and can include the KRS query for the content name in the Interest's name or in a payload of the Interest.

The local KRS service can continue to issue a KRS query each time it receives a routable prefix to another KRS zone until the local KRS service receives a KRS record that includes the security information for the content name, or specifies that security information does not exist for the content name. When the local KRS service receives a Content Object that includes the KRS record, the local KRS service generates a new Content Object that encapsulates the KRS record and whose name matches the name from the initial Interest from the client device. The local KRS service returns this new Content Object over CCN to satisfy the KRS query from the client device.

Similar to the local KRS service, when an authoritative KRS service receives an Interest addressed to its routable prefix, the authoritative KRS service obtains a content name from the Interest's name or payload. The authoritative KRS service then uses this name prefix to search the records in its zone for a KRS record. If the authoritative KRS service has the KRS record, the authoritative KRS service can return a Content Object that includes the KRS record.

On the other hand, if the authoritative KRS service does not store the KRS record for the content name, the authoritative KRS service performs a lookup in a next-hop table to determine a KRS zone for the content name. The authoritative KRS service can implement a recursive forwarding technique or an iterative forwarding technique. In the iterative forwarding technique, the authoritative KRS service generates a Content Object to include the KRS zone in the payload, and to include the same name as the initial Interest, and returns the Content Object to satisfy the initial Interest.

In the recursive forwarding technique, the authoritative KRS service generates a query in the form of an Interest for this KRS zone (with the content name appended to the Interest's name, or in a payload), and disseminates the Interest to obtain a KRS record for the content name from the KRS zone. This KRS record may include security information for the content name, or may include an indication that such security information does not exist. The authoritative KRS service then encapsulates the KRS record in a Content Object that includes the initial Interest's name, and returns this Content Object to satisfy the initial Interest.

In some embodiments, root KRS service 104.1 manages the security information for the top-level prefixes. Unlike other authoritative KRS services, root KRS service 104.1 does not have an organizational responsibility (e.g., a KRS service for the prefix "/parc" is responsible for the name prefix "/parc/csl"). However, the resolution of any top-level prefix depends on the root prefix zone. Because of this, the root prefix zone needs to remain operational and accessible without interruption, which can be achieved, for example, by using a distributed hash table (DHT) or a collection of independently-operated root KRS servers governed by an independent organization.

The local and authoritative KRS services can look up the next destination for a KRS request using a longest-prefix-matching algorithm on the next-hop table. This improves performance and scalability by enabling servers of the KRS service to cache KRS records, and by enabling the use of "default" records to reduce the total number of records stored in the KRS service. For example, a publisher JJ may have a public-private key pair which he uses to sign all content published under the name prefix "/parc/jj." Rather than storing the same key as a separate KRS record for each published Content Object, the KRS service may simply store the key once in the authoritative zone "/parc," with the notation that this record is the final response for any name including the prefix "/parc/jj." In some embodiments, the table used to perform longest-prefix-matching uses a special designation (e.g., an asterisk "*") at a KRS record for a prefix, which indicates that there are no further KRS records below the prefix.

Figure 1B:
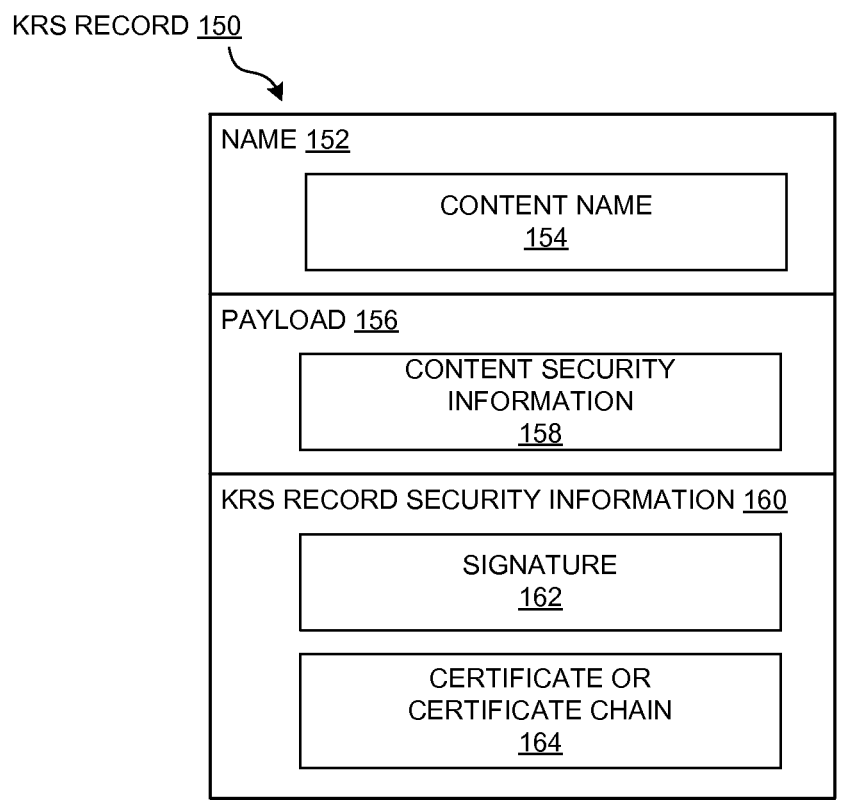
FIG. 1B illustrates an exemplary KRS record in accordance with an embodiment.

FIG. 1B illustrates an exemplary KRS record 150 in accordance with an embodiment. KRS record 150 can include a name 152, a payload 156, and security information 160 for KRS record 150. Name 152 can include the content name (or name prefix) that is being resolved, and payload 156 can include the security information 158 associated with name 152. Security information 158 can include, for example, a public key for the Content Object or a content hash of the Content Object. Also, KRS record 150 is individually secured with a cryptographic signature 162 and carries a public key certificate or certificate chain 164 for the signing key. A consumer receiving KRS record 150 can trust KRS record 150 if signature 162 is valid, and certificate chain 164 for the signing key anchors at a trusted entity (e.g., a global certificate authority). As stated previously, the KRS records are transmitted in a CCN Content Object. These CCN Content Objects also include a signature that can be used to authenticate KRS services, and include a Publisher Public Key Digest (PPKD) field that can be used to validate the Content Object as an acceptable response to an Interest carrying a KRS query to a trusted KRS service instance.

Unlike the Domain Name System (DNS) that implements top-down forwarding, the servers of the KRS service may also employ bottom-up forwarding. In bottom-up forwarding, the local KRS services have a prefix name that assigns to them a place in the prefix hierarchy. When a local KRS service receives a query for which it has no immediate forwarding information, the local KRS service sends the query to its parent (instead of sending the query directly to the root of the prefix tree, as is done in top-down forwarding).

Figure 2:
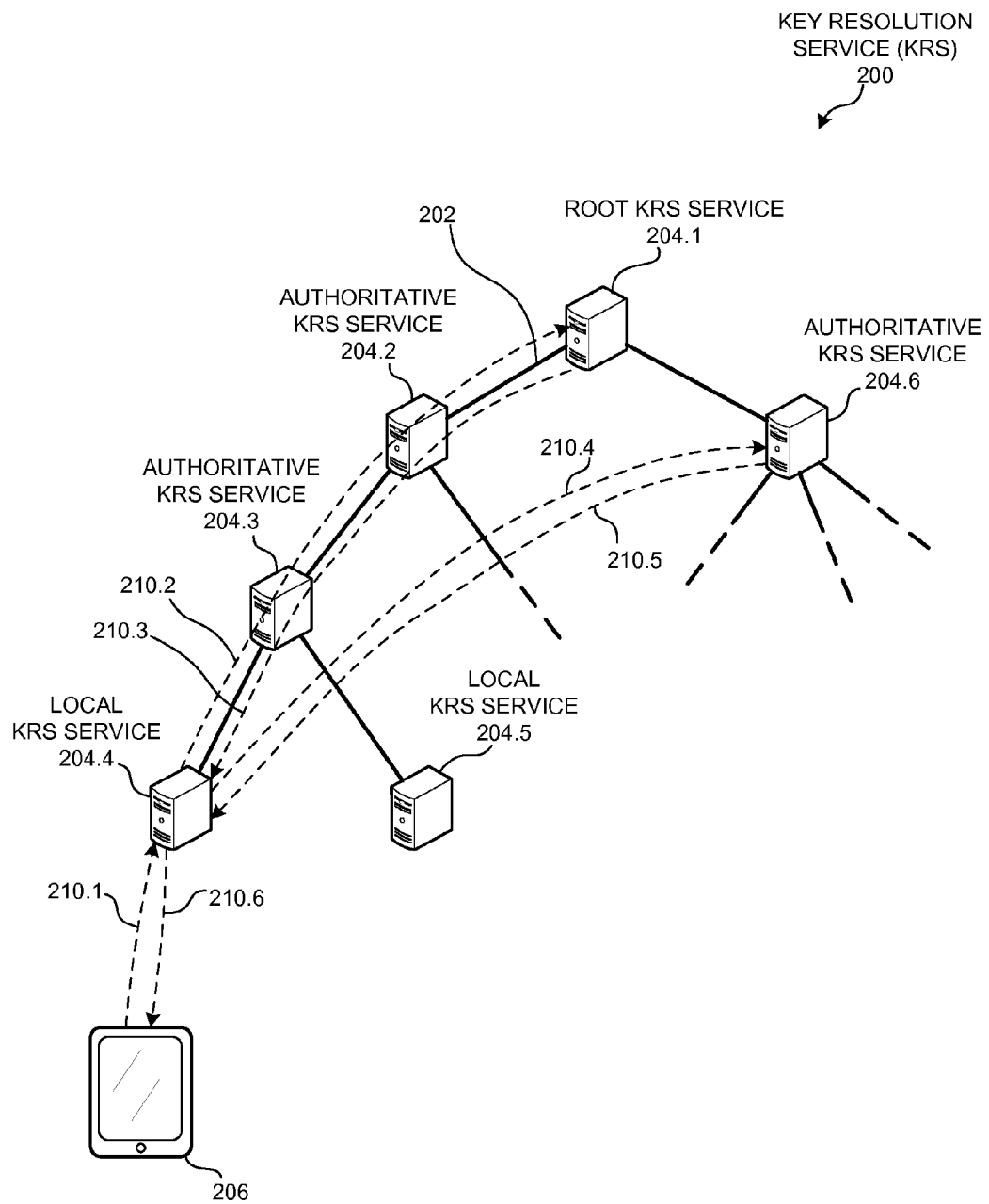
FIG. 2 illustrates an exemplary client device querying the Key Resolution Service in accordance with an embodiment.

FIG. 2 illustrates an exemplary client device 206 querying the Key Resolution Service 200 in accordance with an embodiment. Specifically, KRS service 204 can be organized into a tree topology 202, such that a local KRS service 204.4 has a parent KRS service 204.3. Also, authoritative KRS service 204.3 has a parent KRS service 204.2, whose parent is a root KRS service 204.1.

A client device 206 can disseminate an Interest that includes a KRS query, and CCN nodes can forward this Interest to a local KRS service 204.4 (along a path 210.1). If local KRS service 204.4 does not cache a KRS record for a content name of the KRS query, local KRS service 204.4 can forward the KRS query to a parent KRS service (e.g., authoritative KRS service 204.3). However, if KRS service 204.3 and its parent KRS service 204.2 do not store a KRS record for the content name, query 210.2 may be forwarded to root KRS service 204.1 (e.g., recursively along a path 210.2, or iteratively by local KRS service 204.4).

At this point, root KRS service 204.1 can perform a longest-prefix-matching lookup in a next-hop table to determine a KRS zone for the content name, and returns a Content Object that encapsulates the KRS zone to local KRS service 204.4 (e.g., along path 210.3 if using recursive forwarding, or directly to local KRS service 204.4 if using iterative forwarding). For example, authoritative KRS service 204.6 may be a member of this KRS zone. Local KRS service 204.4 can use the routable prefix for this KRS zone to send the KRS query directly to authoritative KRS service 204.6 (along a path 210.4). Authoritative KRS service 204.6 processes the KRS query to return a KRS record that specifies the security information for the content name of the KRS query (along a path 210.5). Local KRS service 204.4 can encapsulate the security information in a Content Object (with the same name as the initial Interest from client device 206), and returns this Content Object to client device 206 over a path 210.6.

In some embodiments, KRS services can update their local next-hop table when they receive a Content Object (from a parent KRS service) that includes a KRS zone for given content name or name prefix. This way, if authoritative KRS service 204.3 receives a query Interest for the same query prefix from another local KRS service 204.5, authoritative KRS service 204.3 can obtain the KRS record directly from KRS service 204.6 without requiring the KRS query to propagate all the way to root KRS service 204.1.

Also, the KRS records can be cached by the local KRS services, by the authoritative KRS services, and/or they may also be cached by nodes of the underlying CCN network. However, typical CCN nodes perform exact matching when searching for KRS records to satisfy an Interest, unlike the KRS services that can perform longest-prefix matching when searching for a KRS record that can be used to satisfy an Interest.

To highlight the distinction between these two forms of caching, consider the example where a local KRS service receives a request to resolve "/parc/csl/papers/krs.pdf." In the process of iteratively resolving this request, the local KRS service receives and caches the KRS records for "/parc," "/parc/csl," and "/parc/csl/papers." At a later time, the local KRS service may receive another request to resolve the name prefix "/parc/csl/papers/paper2.pdf". Though these two requests share the prefix "/parc/csl/papers," CCN caching does not provide any benefits because CCN caching requires performing exact matching (e.g., requiring two names to include the same components in the same order). However, since servers of the KRS service translate Interest and Content Object packets into query prefixes, these servers may perform longest-prefix matching on these query prefixes to reduce the number of KRS referrals necessary. Continuing the example from above, the local KRS service may satisfy the KRS query for "/parc/csl/papers/paper2.pdf" by taking advantage of the cached entry for "/parc/csl/papers" to resolve the full KRS request with only one referral to the authoritative KSR server for "/parc/csl/papers."

Local KRS Service

Figure 3:
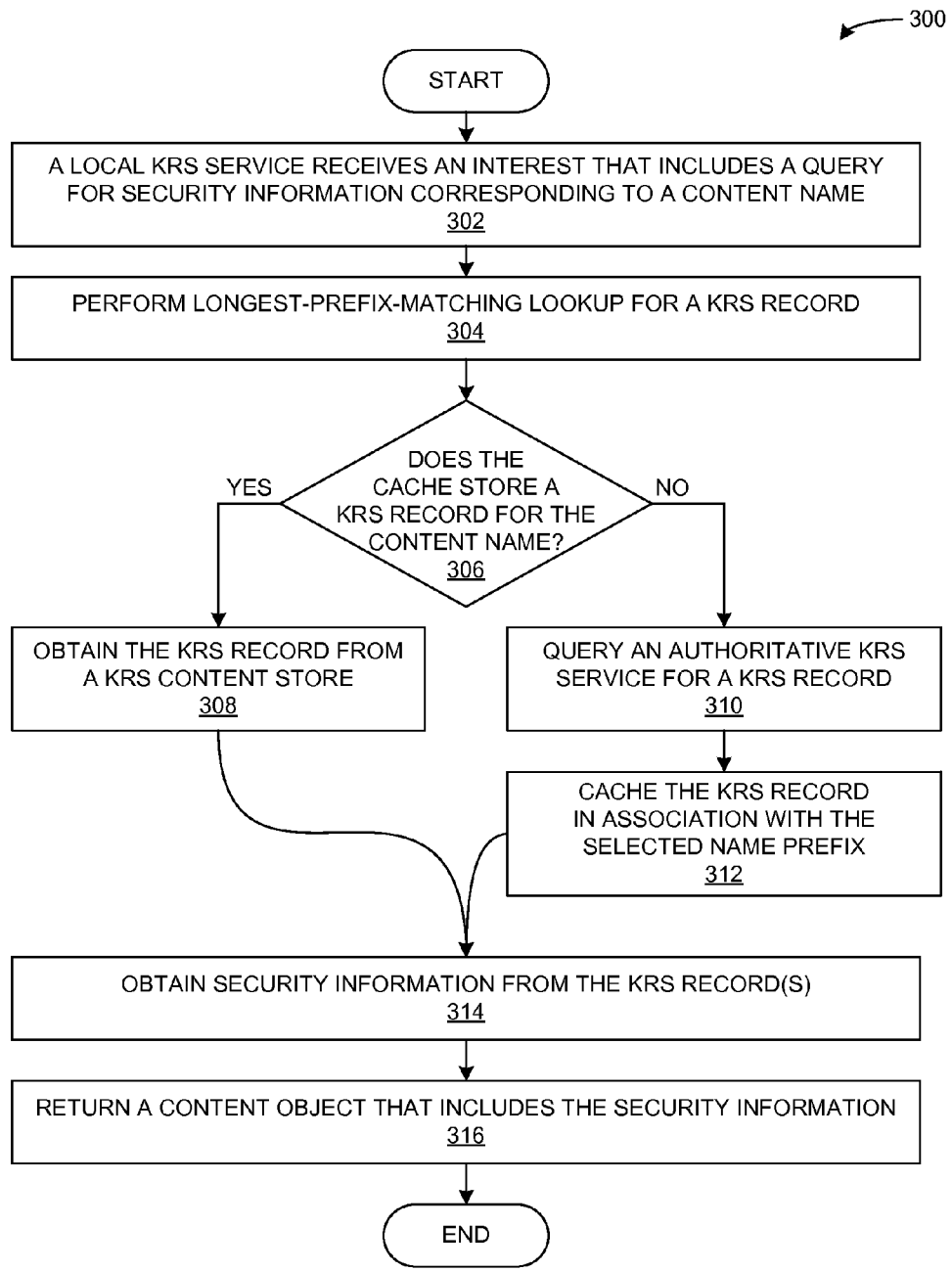
FIG. 3 presents a flow chart illustrating a method for processing a key-resolution query by a local KRS service in accordance with an embodiment.

FIG. 3 presents a flow chart illustrating a method 300 for processing a KRS query by a local KRS service in accordance with an embodiment. The local KRS service can be deployed across, and executed by, one or more servers of the underlying KRS service. During operation, the local KRS service can receive an Interest that includes a query for security information corresponding to a content name (operation 302). The Interest can include the KRS query in the Interest's name, or in a payload. For example, the Interest's name can have the form:

/krs/q=/{QUERY_PREFIX}     (1)

In expression (1), the prefix "/krs" includes a routable prefix that routes the Interest to a local KRS service, which is local to the client device that disseminated the Interest. Also, "q=/{QUERY_PREFIX}" specifies the KRS query to obtain security information for a Content Object being validated by the client device. For example, a Content Object for a "Sports Headlines" web page from the New York Times may include a structured name: "/NYTimes/Sports/Headlines/index.html." The KRS service may store security information for the name prefix "/NYTimes/Sports/Headlines," or for any prefix of this name prefix.

In some embodiments, the local KRS service can search for security information corresponding to one or more name prefixes of the Interest's KRS query. The local KRS service can perform a longest-prefix-matching lookup for a KRS record whose name is a longest match to content name in the Interest's KRS query (operation 304), and determines whether a local cache or Content Store stores a KRS record for the content name (operation 306).

If the local KRS service is storing the KRS record in the KRS Content Store, the local KRS service obtains the KRS record from the KRS Content Store (operation 308). Otherwise, the local KRS service obtains the KRS record by querying an authoritative KRS service (operation 310), and can create an entry in the KRS Content Store to cache the KRS record in association with the content name (operation 312).

The local KRS service then analyzes the KRS records to obtain security information for the query prefix (operation 314), and returns a Content Object that includes this security information (operation 316). Continuing the above example, the local KRS service may analyze the KRS record to obtain security information for the name prefix "/NYTimes/Sports/," and returns a Content Object that includes this security information.

Figure 4:
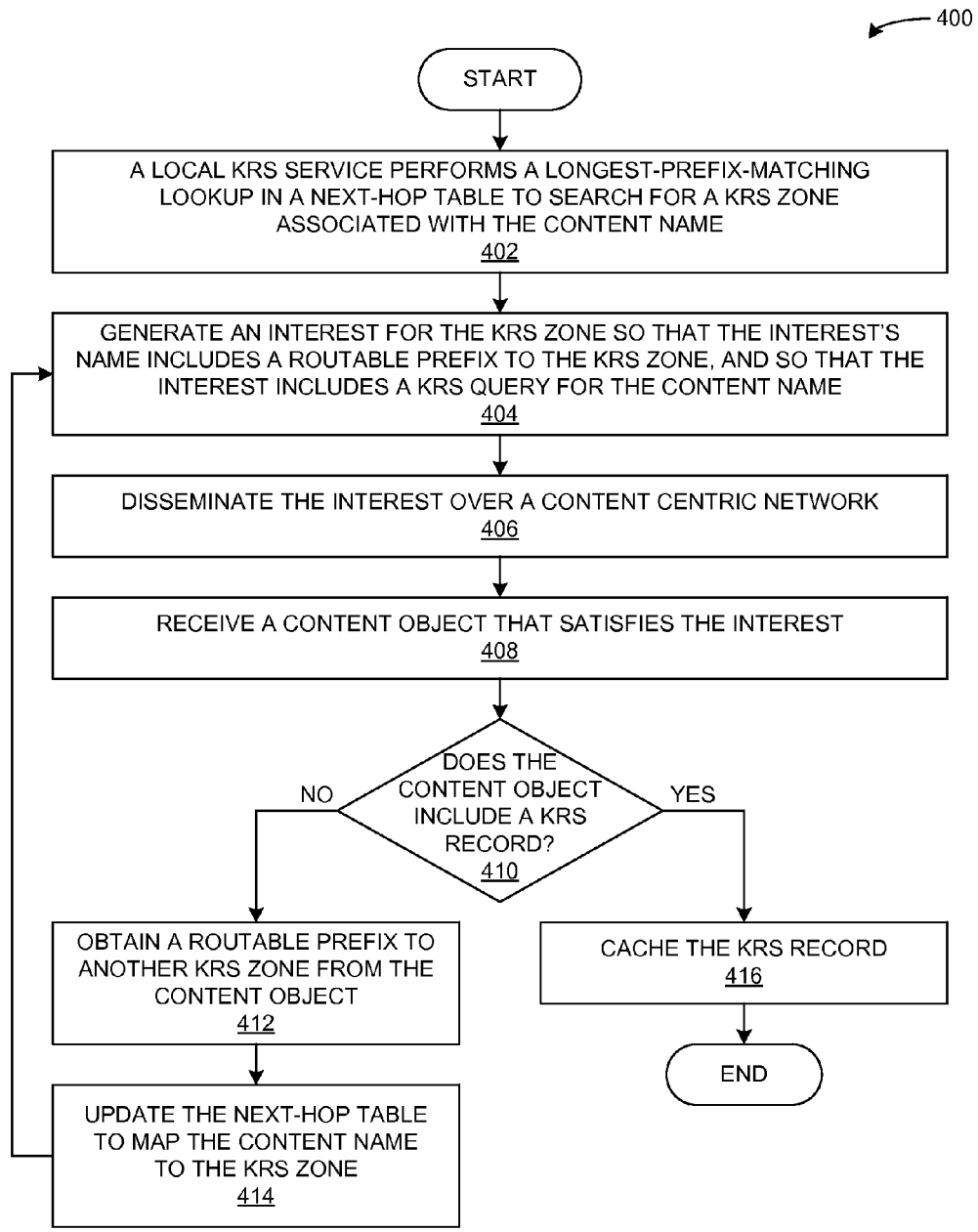
FIG. 4 presents a flow chart illustrating a method for obtaining a KRS record from an authoritative KRS service in accordance with an embodiment.

FIG. 4 presents a flow chart illustrating a method 400 for obtaining a KRS record from an authoritative KRS service in accordance with an embodiment. During operation, the local KRS service can perform a longest-prefix-matching lookup in a next-hop table to search for a KRS zone associated with a content name (operation 402). Continuing the example from above, while querying an authoritative KRS service for the name prefix /NYTimes/Sports/headlines," the local KRS service may not find any KRS records for the name "/NYTimes/Sports/headlines" (or for a prefix thereof). However, the local KRS service may find an entry in the next-hop table for the name prefix "/NYTimes/Sports," as the longest-prefix match to the name prefix "/NYTimes/Sports/headlines."

The local KRS service then generates a recursive Interest for the KRS zone, which can include the KRS query in the Interest's name or payload. If the Interest includes the KRS query in the name, the Interest's name can have the form:

{ROUTABLE_PREFIX}/krs/q=/{QUERY_PREFIX}     (2)

In expression (2), {ROUTABLE_PREFIX} includes the routable prefix to the KRS zone, which the CCN forwarder nodes use to forward the recursive Interest to any authoritative KRS service that belongs to the target KRS zone. The name portion "/krs/q=/" designates the beginning of the KRS query, and {QUERY_PREFIX} specifies the name prefix for which to obtain the security information (e.g., "/NYTimes/Sports/headlines"). The local KRS service then disseminates the recursive Interest over CCN (operation 406).

After disseminating the recursive Interest, the local KRS service can obtain a Content Object that satisfies the Interest (operation 408), and determines whether the Content Object includes a KRS record or a routable prefix to another KRS zone (operation 410). If the KRS record includes a routable prefix to another KRS zone, the local KRS service can obtain the routable prefix from the Content Object (operation 412), and updates the next-hop table to map the content name to the KRS zone (operation 414). The local KRS service then returns to operation 404 to generate a recursive Interest to the KRS zone.

On the other hand, if the local KRS service determines at operation 410 that the Content Object includes a KRS record, the local KRS service can cache the KRS record in association with the query's name prefix (operation 416). The local KRS service can then use the KRS record to return security information to the client device.

Authoritative KRS Service

In some embodiments, an authoritative KRS service can process a recursive Interests either iteratively or recursively. For example, when responding to Interests iteratively, the authoritative KRS service can return a KRS record if it exists, or can return a routable prefix to another KRS zone if one is found. The authoritative KRS service may return the security information by responding to the Interest with a Content Object (CO) having the form:

iterative CO: {ROUTABLE PREFIX}::{ZONE}::
        {SECURITY}                                            (3)

In expression (3), {ROUTABLE PREFIX} contains the routable prefix of the authoritative server for the next zone, and {ZONE} contains the prefix that this zone is responsible for. Also, {SECURITY} contains the security information necessary for the receiver to verify the integrity of responses coming from this server, such as a certificate chain or public key.

On the other hand, when responding to Interests recursively, the authoritative KRS service can obtain another KRS zone from a next-hop table, and disseminates a recursive Interest to the KRS zone to obtain the security information. Then, similar to a local KRS service, when the authoritative KRS service receives a Content Object, the authoritative KRS service either uses the Content Object's KRS record to respond to the original Interest, or uses the Content Object's KRS zone to construct another Interest.

Figure 5:
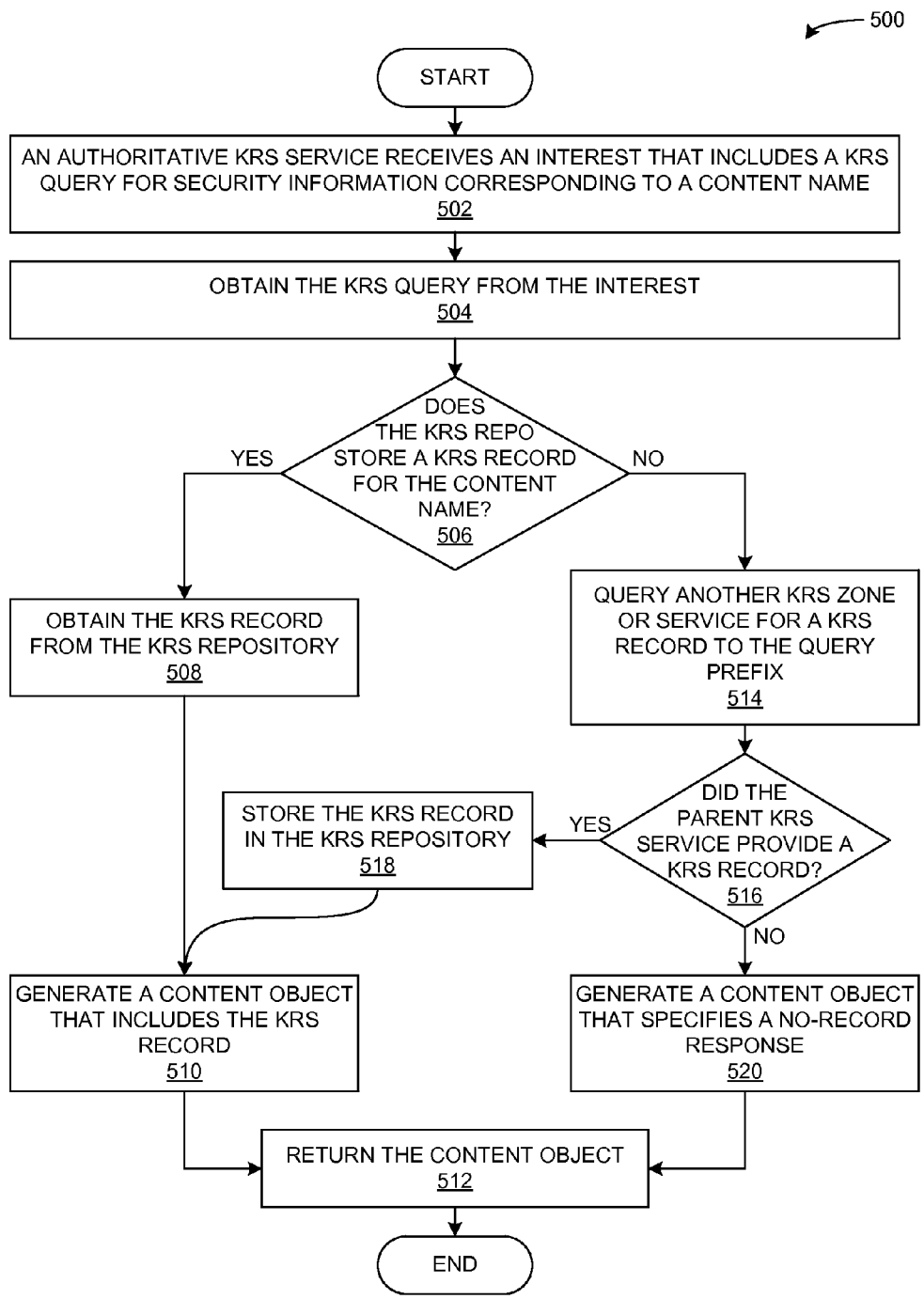
FIG. 5 presents a flow chart illustrating a method for responding to an Interest iteratively by an authoritative KRS service in accordance with an embodiment.

FIG. 5 presents a flow chart illustrating a method 500 for responding to an Interest iteratively by an authoritative KRS service in accordance with an embodiment. During operation, the authoritative KRS service can receive an Interest that includes a KRS query for security information corresponding to a content name (operation 502), and analyzes the Interest to obtain the KRS query (operation 504).

The authoritative KRS service then determines whether the KRS repository stores a KRS record for the content name (operation 506). If so, the authoritative KRS service obtains the KRS record from the KRS repository (operation 508), generates a Content Object that includes the KRS record (operation 510), and returns the Content Object (operation 512).

If the KRS repository does not store a KRS record for the name prefix, the authoritative KRS service can query another KRS zone or another KRS service (operation 514). For example, the authoritative KRS service can perform a lookup in the next-hop table for another KRS zone associated with the content name. Recall that the Key Resolution Service includes a set of authoritative KRS services organized into a tree topology. Hence, if the next-hop table does not store an entry for the content name, the authoritative KRS service can query its parent KRS service for a KRS record for the content name.

The authoritative KRS service then determines whether the parent KRS service provided a KRS record (operation 516). If so, the authoritative KRS service stores the KRS record in the KRS repository (operation 518), and proceeds to operation 510 to generate and return a Content Object that includes the KRS record. On the other hand, if the parent KRS service does not provide a KRS record, the authoritative KRS service generates a Content Object which includes a no-record response (e.g., a response specifying that a KRS record does not exist for the query prefix) (operation 520), and proceeds to operation 512 to return the Content Object.

Figure 6:
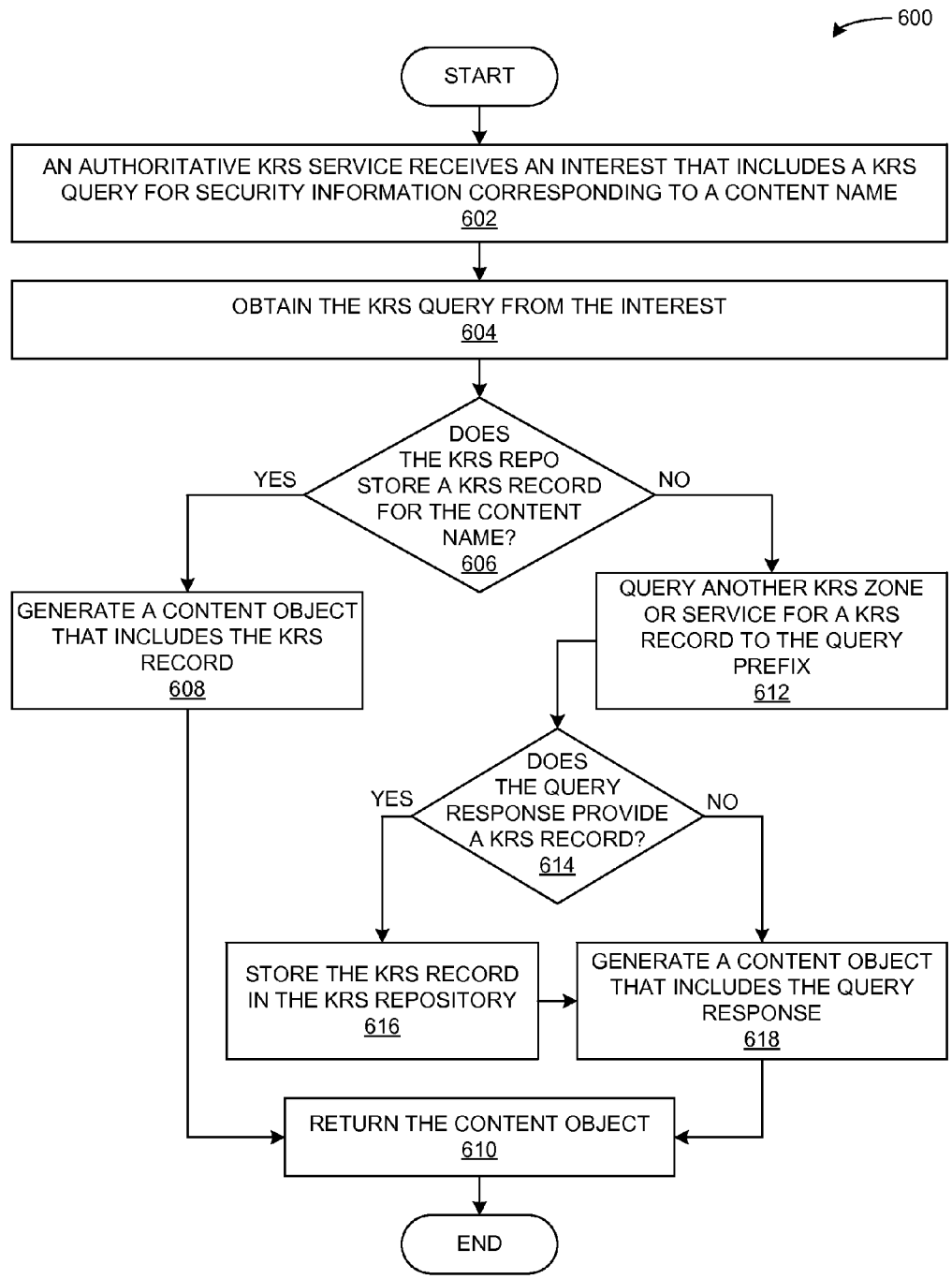
FIG. 6 presents a flow chart illustrating a method for responding to an Interest recursively by an authoritative KRS service in accordance with an embodiment.

FIG. 6 presents a flow chart illustrating a method 600 for responding to an Interest recursively by an authoritative KRS service in accordance with an embodiment. During operation, the authoritative KRS service can receive an Interest that includes a KRS query for security information corresponding to a content name (operation 602), and analyzes the Interest to obtain the KRS query (operation 604).

The authoritative KRS service then determines whether the KRS repository stores a KRS record for the content name (operation 606). If so, the authoritative KRS service generates a Content Object that includes the KRS record (operation 608), and returns the Content Object (operation 610).

On the other hand, if the KRS repository does not store a KRS record for the content name, the authoritative KRS service can query another KRS zone or KRS service for a KRS record (operation 612). This remote KRS service may correspond to an authoritative KRS service for a zone identified in the next-hop table, or may be a parent KRS service to the authoritative KRS service. The authoritative KRS service analyzes the query response from the other KRS zone or service to determine whether the response includes a KRS record (operation 616). If not, the KRS service generates a Content Object that includes the query response (operation 618), and proceeds to operation 610 to return the Content Object. This query response can include a routable prefix to another KRS zone, which a local KRS service can use to forward a query to the KRS zone via the iterative forwarding technique.

On the other hand, if the query response includes a KRS record, the KRS service stores the KRS record in the KRS repository (operation 616), and proceeds to operation 610 to generate and return a Content Object that includes the query response.

Client Device

Figure 7:
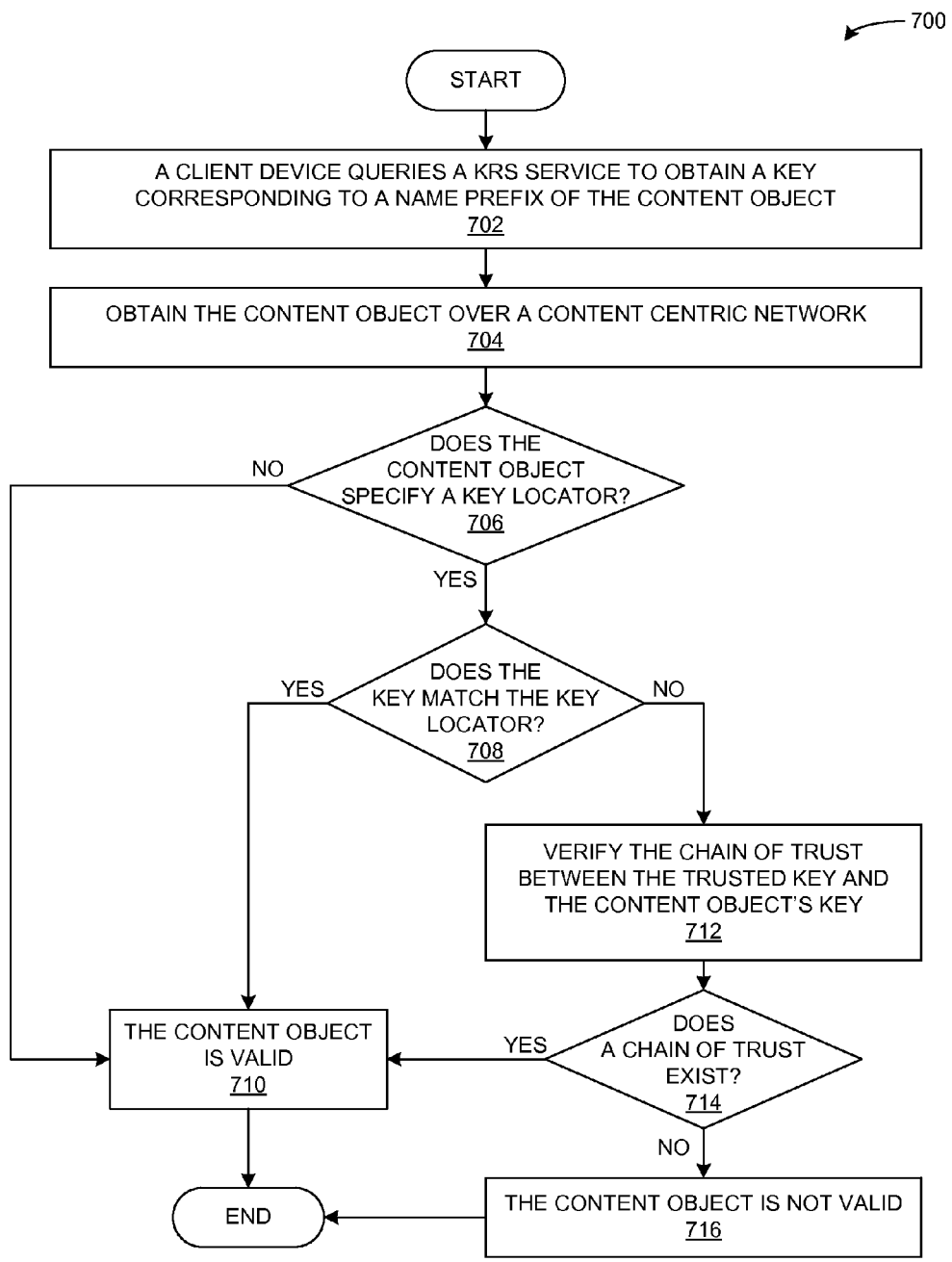
FIG. 7 presents a flow chart illustrating a method for validating a Content Object in accordance with an embodiment.

FIG. 7 presents a flow chart illustrating a method 700 for validating a Content Object in accordance with an embodiment. During operation, the client device can query the KRS service to obtain a trusted key corresponding to a desired Content Object (operation 702). The client device can also obtain the Content Object over CCN by disseminating an Interest that includes the Content Object's name (operation 704).

Some pieces of data are signed using a key from the data's publisher, while other pieces of data may be left unsigned. When the client device receives the Content Object, the client device can analyze the Content Object to determine whether the Content Object specifies a key locator (operation 706). If the Content Object does not specify a key locator, the client device determines that the Content Object is valid (operation 710). Otherwise, the client device determines whether the key matches the key locator (operation 708). Recall that the KRS service is a trusted entity that stores keys for various name prefixes. Hence, if the key obtained from the KRS service matches the Content Object's key locator, the client device determines that the Content Object is valid (operation 710).

Otherwise, the client device verifies the chain of trust between the trusted key (from the KRS service) and the Content Object's key (operation 712). If the client device can verify that the chain of trust exists (operation 714), the client device determines that the Content Object is valid (operation 710). Otherwise, if the client device cannot verify that the chain of trust exists, the client device determines that the Content Object is not valid (operation 716).

For example, the Content Object can include a web page with the name "/NYTimes/Sports/headlines/index.html," and can specify a key locator "/NYTimes/Sports/headlines/key" for a key that is used to authenticate content with the name prefix "/NYTimes/Sports/headlines." However, the KRS service may only store a key for the name prefix "/NYTimes" (e.g., a key named "/NYTimes/key"). Hence, the client device would need to obtain a set of keys over CCN that establishes a chain of trust between the trusted key "/NYTimes/key" and the Content Object's key "/NYTimes/Sports/headlines/key."

Figure 8A:
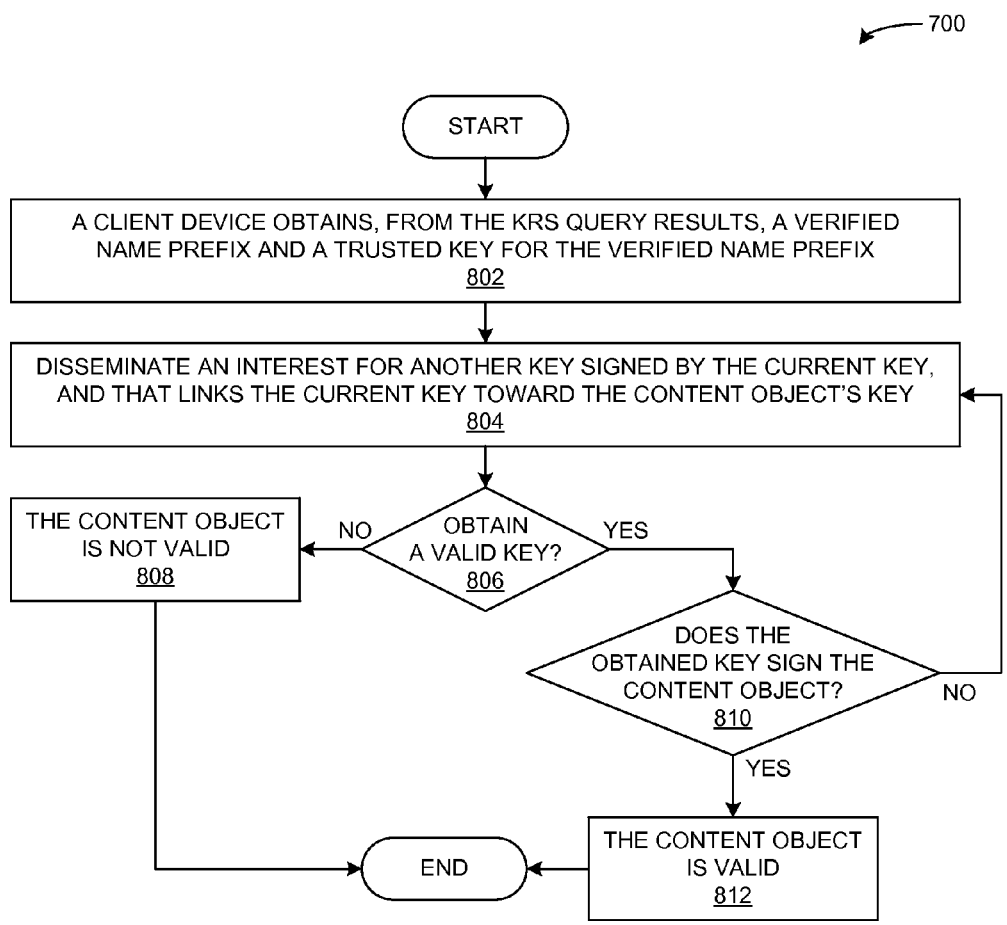
FIG. 8A presents a flow chart illustrating a method for analyzing a chain of trust between a trusted key from the KRS system and the Content Object's key in accordance with an embodiment.

FIG. 8A presents a flow chart illustrating a method 800 for analyzing a chain of trust between a trusted key from the KRS service and the Content Object's key in accordance with an embodiment. During operation, the client device can obtain, from the KRS query results (e.g., from a KRS record), a verified name prefix and a trusted key for the verified name prefix (operation 802). Continuing the example from above, the KRS query results can include the trusted key "/NYTimes/key" for the verified name prefix "/NYTimes."

To establish the chain of trust starting from the trusted key, the client device can disseminate an Interest for a key which is signed by the current key, and that links the current key toward the Content Object's key (operation 804). For example, in the initial iteration, the current key is the trusted key "/NYTimes/key." The client device disseminates an Interest for the key "/NYTimes/Sports/key," so that this key is signed by the current key "/NYTimes/key." While there may exist multiple keys "/NYTimes/Sports/key" across CCN nodes, the client device is only interested in the key that is signed by the current key in the verified chain (e.g., signed by "/NYTimes/key").

After disseminating the Interest, the client device determines whether it has obtained a valid key (operation 806). If the next key does not exist, or an invalid key was received (e.g., the next key was not signed by the current trusted key), the client device determines that the Content Object is not valid (operation 808). Otherwise, the client device determines whether the obtained key authenticates the Content Object (operation 810). For example, the client device can determine whether the key authenticates the Content Object by determining whether the key's name matches the Content Object's key locator. If so, the client device determines that the Content Object is valid (operation 812).

However, if the obtained key does not sign the Content Object, the client device can return to operation 804 to disseminate an Interest for the next key that is signed by the last key along the current validated chain of trust. For example, during the second iteration, the client device can return to operation 804 to disseminate an Interest for a key "/NYTimes/Sports/Headlines/key" that is signed by the key "/NYTimes/Sports/key."

In some embodiments, the client device can verify the chain of trust by iteratively searching for keys, starting from the Content Object's key locator, to form a key chain between the trusted key (e.g., a key from a KRS service) and the Content Object's key.

Figure 8B:
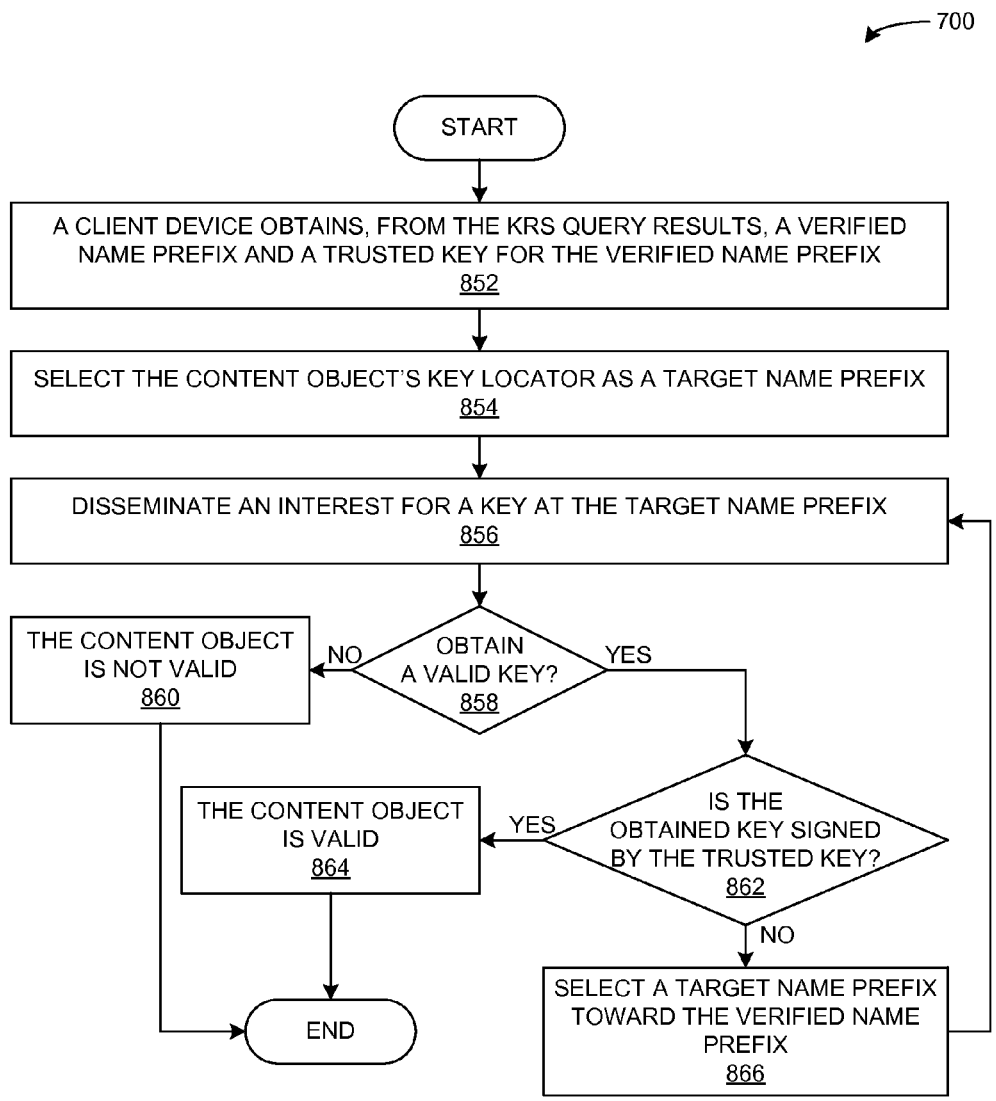
FIG. 8B presents a flow chart illustrating a method for analyzing a chain of trust between a Content Object's key and a trusted key from the KRS system in accordance with an embodiment.

FIG. 8B presents a flow chart illustrating a method 850 for analyzing a chain of trust between a Content Object's key and a trusted key from the KRS service in accordance with an embodiment. During operation, the client device can obtain, from the KRS query results, a verified name prefix and a trusted key for the verified name prefix (operation 852). The client device begins verifying the chain of trust by selecting the Content Object's key locator as the target name prefix (operation 854), and disseminates an Interest for a key at the target name prefix (operation 856). For example, continuing the example from above, the "target name prefix" may initially correspond to the key locator "/NYTimes/Sports/headlines/key." Then to verify the chain of trust, the client device determines whether it has obtained a valid key (operation 858). If the client device could not obtain a key, or a valid key, the client device determines that the Content Object is not valid (operation 860).

On the other hand, if the client device does obtain a valid key, the client device determines whether the obtained key is signed by the trusted key (from the KRS service) (operation 862). If the obtained key is indeed signed by the trusted key, the client device has successfully validated the chain of trust, and goes on to determine that the Content Object is indeed valid (operation 864). However, if the obtained key is not signed by the trusted key, the client device selects a target name prefix for a key that may complete the chain of trust toward the trusted key (operation 866). For example, during the first iteration, the client device may obtain the key "/NYTimes/Sports/headlines/key" which can be used to authenticate the Content Object "/NYTimes/Sports/headlines/index.html." Since this key is not signed by the trusted key "/NYTimes/key," the client device selects the name "/NYTimes/Sports/key" as the next target name prefix, and returns to operation 856 to disseminate an Interest for this target name prefix.

The client device can obtain the key "/NYTimes/Sports/key" over CCN, which can be satisfied by any device operating on the CCN network. Because of this, it is possible that the client device may receive a key that does not sign the key "/NYTimes/Sports/headlines/key." In this case, the client device can disseminate additional Interests (e.g., Interests directed to other segments of the CCN network) to search for an instance of the key which does sign the key "/NYTimes/Sports/headlines/key." If the client device cannot find a valid key after a predetermined number of attempts, the client device can conclude that a valid key does not exist.

Managing KRS Records

A publisher can create a new KRS record to be stored in an authoritative KRS service by first creating the new security information to be stored in the KRS service. This new KRS record can correspond to a name prefix that the publisher will use to publish self-certified content. The publisher can create this security information by producing a pair of keys, a content-signature, a hash digest of the Content Object, or any other security-related information now known or later developed. The publisher can then have the appropriate KRS signing entity (e.g., a CA) sign the new KRS record, and provides the signed KRS record to an authoritative KRS service of the desired KRS zone. The authoritative KRS service stores the KRS record, and uses the KRS record to perform a longest-matching-prefix lookup on the publisher's name prefix.

For example, the publisher can use CCN to create, update, or delete a KRS entry using a communication protocol as follows.

"create" Interest: {ROUTABLE PREFIX}/krs/create/
    {PREFIX}/{SECURITY}                                (4)

"create" CO: {PREFIX}::{SECURITY}::{SIGNA-
    TURE}                                              (5)

"update" Interest: {ROUTABLE PREFIX}/krs/up-
    date/{PREFIX}/{SECURITY}                           (6)

"update" CO: {PREFIX}::{SECURITY}::{SIGNA-
    TURE}                                              (7)

"delete" Interest: {ROUTABLE PREFIX}/krs/delete/
    {PREFIX}/                                          (8)

"delete" CO: {PREFIX}::"NONE"::{SIGNATURE}             (9)

The publisher creates and disseminates Interests using an expression (4), (6), or (8), which is forwarded over CCN toward an authoritative KRS service associated with the routable prefix of the Interest. The authoritative KRS service responds to the publisher by generating and returning a corresponding Content Object (CO) using expression (5), (7), or (9). More specifically, in expressions (4)-(9), {ROUTABLE PREFIX} represents the routable prefix to the authoritative KRS service, {PREFIX} represents the full prefix for the KRS record (e.g., a prefix of the content object), and {SECURITY} represents security information for the prefix. Also, in expressions (5), (7), and (9), {SIGNATURE} represents security provided by the signing entity for the KRS record.

In some embodiments, the publisher can provide an unsigned KRS record to a KRS signing entity, using an off-line data transfer, or through CCN itself. When using CCN to provide the unsigned KRS record, the publisher can use expression (4) to provide the unsigned KRS record to the KRS signing entity, and the KRS signing entity can use expression (5) to return the signature. In expressions (4) and (5), {ROUTABLE PREFIX} represents the routable prefix of the signing entity, {PREFIX} represents the full prefix to be stored in the KRS, {SECURITY} represents the security information for the prefix, and {SIGNATURE} represents the signature provided by the signing entity.

When the signing entity receives an unsigned entry, the signing entity can perform a form of access-control before signing the KRS record and returning the signed KRS record to the publisher. This access-control can involve verifying the publisher's identity, for example, using a name and password, by performing cryptographic verification, etc. However, the selection of an individual access-control policy, as well as the protocol or communication necessary to enact the policy, is outside the scope of the paper. Such a policy may entail several more Interest/Data pairs, but what is important for the sake of the KRS Update Protocol is that the publisher initiates communication with the Interest, and the signing entity responds to this Interest with the corresponding Data packet once the operation has been authorized.

In some embodiments, the KRS service may distribute the routable prefix of the signing entity to the publishers. However, to achieve a higher level of security, an organization may distribute this information through off-line channels. In some other embodiments, a publisher might have a dedicated prefix (e.g., a publisher "JJ" can publish content under the prefix "/parc/users/jj"), in which case the publisher can be its own signing entity.

Once a publisher receives the signed response from the signing entity, the publisher then provides the received security information to an authoritative KRS service of the target KRS zone. The publisher can provide the security information through a push-based communication over CCN, or through an off-line manual configuration.

Figure 9:
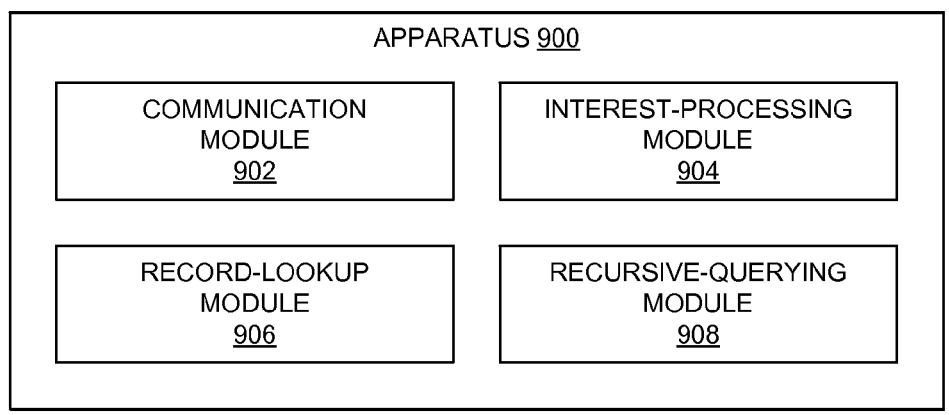
FIG. 9 illustrates an exemplary apparatus that facilitates resolving keys for Content Objects in accordance with an embodiment.

FIG. 9 illustrates an exemplary apparatus 900 that facilitates resolving keys for Content Objects in accordance with an embodiment. Apparatus 900 can comprise a plurality of modules which may communicate with one another via a wired or wireless communication channel. Apparatus 900 may be realized using one or more integrated circuits, and may include fewer or more modules than those shown in FIG. 9. Further, apparatus 900 may be integrated in a computer system, or realized as a separate device which is capable of communicating with other computer systems and/or devices. Specifically, apparatus 900 can comprise a communication module 902, an Interest-processing module 904, a record-lookup module 906, and a record-querying module 908.

In some embodiments, communication module 902 can receive an Interest with a name that includes a routable prefix associated with the key-resolution server, and includes a query prefix for a first Content Object. Interest-processing module 904 can parse the Interest to obtain the query prefix for the Content Object. Record-lookup module 906 can obtaining a cryptographic key associated with at least a prefix from the Content Object's query prefix, for example, by performing a longest-prefix-matching lookup based on the query prefix to obtain a key-resolution record. Record-querying module 908 can also obtain a routable prefix for a key-resolution zone associated with the query prefix, and disseminates an Interest that queries a key-resolution server of the zone to obtain a trusted key for the Content Object.

Figure 10:
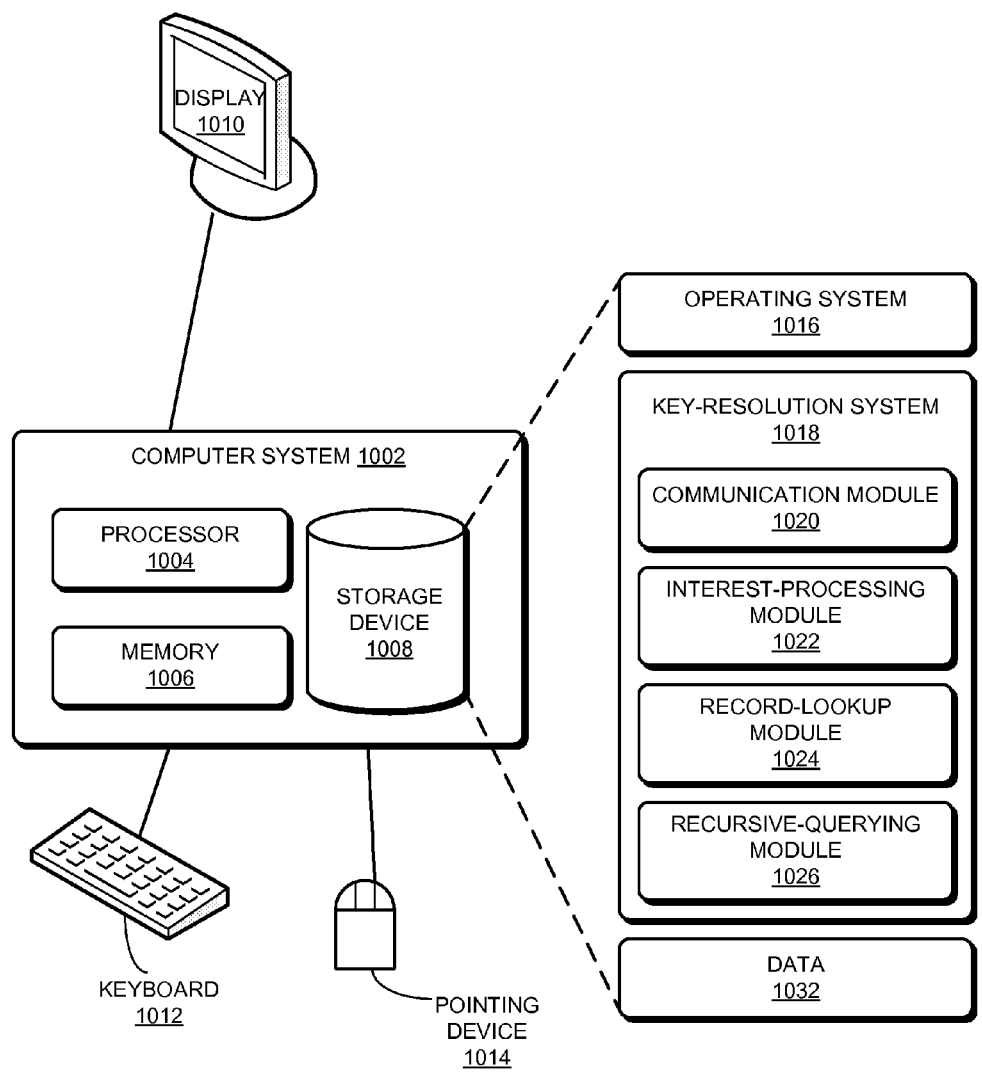
FIG. 10 illustrates an exemplary computer system that facilitates resolving keys for Content Objects in accordance with an embodiment.

FIG. 10 illustrates an exemplary computer system 1002 that facilitates resolving keys for Content Objects in accordance with an embodiment. Computer system 1002 includes a processor 1004, a memory 1006, and a storage device 1008. Memory 1006 can include a volatile memory (e.g., RAM) that serves as a managed memory, and can be used to store one or more memory pools. Furthermore, computer system 1002 can be coupled to a display device 1010, a keyboard 1012, and a pointing device 1014. Storage device 1008 can store operating system 1016, a key-resolution service 1018, and data 1026.

Key-resolution service 1018 can include instructions, which when executed by computer system 1002, can cause computer system 1002 to perform methods and/or processes described in this disclosure. Specifically, key-resolution service 1018 may include instructions for receiving an Interest with a name that includes a routable prefix associated with the key-resolution server, and includes a query prefix for a first Content Object (communication module 1020).

Key-resolution service 1018 can also include instructions for parsing the Interest to obtain the query prefix for the Content Object (Interest-processing module 1022), and for obtaining a cryptographic key associated with at least a prefix from the Content Object's query prefix (record-lookup module 1024). For example, key-resolution service 1018 can obtain the cryptographic key by performing a longest-prefix-matching lookup based on the query prefix to obtain a key-resolution record. Key-resolution service 1018 can also include instructions that can obtain a routable prefix for a key-resolution zone associated with the query prefix, and disseminates an Interest that queries a key-resolution server of the zone to obtain a trusted key for the Content Object (record-querying module 1026).

Data 1028 can include any data that is required as input or that is generated as output by the methods and/or processes described in this disclosure. Specifically, data 1028 can store at least a repository for a plurality of final KRS records, and a lookup data structure (e.g., a lookup table) that facilitates performing a longest-prefix-matching lookup using a query prefix as input to select a KRS record that can satisfy a query for security information. Data 1028 can also store a next-hop table that facilitates performing a longest-prefix-matching lookup to determine a KRS zone associated with a given content name or name prefix.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
  receiving, by a server computer of the key-resolution service (KRS) over a Content Centric Network, an Interest message with a name that includes a routable prefix associated with the key-resolution service, wherein the Interest includes a query for a content name that is to be resolved in the name or a payload of the Interest;
  obtaining, from the Interest message, the content name that is to be resolved;
  obtaining, by the server computer, a KRS record for the content name, wherein the KRS record includes security information for the content name or security information for a prefix of the content name, wherein obtaining the KRS record involves:
    performing a longest-prefix-matching lookup in a next-hop table, using the content name as input, to obtain a second routable prefix for a key-resolution zone associated with the content name or a prefix of the content name;
    disseminating, over the Content Centric Network, a second Interest message that includes the query for the content name, and whose name includes the second routable prefix for the key-resolution zone; and
    in response to receiving, from the key-resolution zone, a Content Object that includes a routable prefix for a second key-resolution zone, obtaining the KRS record from the second key-resolution zone; and
  returning, by the server computer, a Content Object whose payload includes the security information that satisfies the query, and whose name includes the Interest message's name, to satisfy the Interest message.

2. The method of claim 1, wherein the Content Object's payload includes the KRS record.

3. The method of claim 1, wherein the KRS record includes at least one of:
  a name or name prefix for which the KRS record resolves security information;
  a payload comprising security information for the name or name prefix; and
  security information that is used to authenticate the KRS record.

4. The method of claim 1,
  wherein generating the second Interest message involves including the query for the content name in the name or a payload of the second Interest message.

5. The method of claim 1, wherein a respective entry of the next-hop table includes at least one of:
  a name or name prefix;
  a routable prefix for a key-resolution zone mapped to the name or name prefix; and
  a public key for a key-resolution service associated with the key-resolution zone.

6. The method of claim 1, wherein obtaining the KRS record from the second key-resolution zone involves:
  generating a third Interest message whose name includes the routable prefix for the second key-resolution zone, and includes the query for the content name in the name or a payload of the third Interest; and
  responsive to disseminating the third Interest for the second key-resolution zone, receiving a Content Object that includes the KRS record.

7. The method of claim 1, further comprising updating the next-hop table to include an entry that maps the content name to the routable prefix for the second key-resolution zone.

8. The method of claim 1, further comprising:
  responsive to disseminating the second Interest for the key-resolution zone, receiving a Content Object that satisfies the second Interest, and includes the KRS record; and
  caching the KRS record in a KRS record repository.

9. The method of claim 1, wherein obtaining the KRS record involves:
  performing a longest-prefix-matching lookup in a KRS record repository, using the content name as input, to obtain the KRS record that includes the security information associated with at least a prefix of the content name.

10. The method of claim 1, wherein the security information for the content name or a prefix of the content name in the KRS record includes one or more of:
  a public key;
  a public key certificate;
  a certificate chain;
  a cryptographic digest of a Content Object; and
  a cryptographic digest of a content object, signed by the Content Object's producer or a trusted entity.

11. A non-transitory computer-readable storage medium storing instructions that when executed by a computer cause the computer to perform a method, the method comprising:
  receiving, over a Content Centric Network, an Interest message with a name that includes a routable prefix associated with a key-resolution service, wherein the Interest includes a query for a content name that is to be resolved in the name or a payload of the Interest;
  obtaining, from the Interest message, the content name that is to be resolved;
  obtaining a KRS record for the content name, wherein the KRS record includes security information for the content name or security information for a prefix of the content name, wherein obtaining the KRS record involves:
    performing a longest-prefix-matching lookup in a next-hop table, using the content name as input, to obtain a second routable prefix for a key-resolution zone associated with the content name or a prefix of the content name;
    disseminating, over the Content Centric Network, a second Interest message that includes the query for the content name, and whose name includes the second routable prefix for the key-resolution zone; and
    in response to receiving, from the key-resolution zone, a Content Object that includes a routable prefix for a second key-resolution zone, obtaining the KRS record from the second key-resolution zone; and returning a Content Object whose payload includes the security information that satisfies the query, and whose name includes the Interest message's name, to satisfy the Interest message.

12. The storage medium of claim 11, wherein the Content Object's payload includes the KRS record.

13. The storage medium of claim 11, wherein the KRS record includes at least one of:
   a name or name prefix for which the KRS record resolves security information;
   a payload comprising security information for the name or name prefix; and
   security information that is used to authenticate the KRS record.

14. The storage medium of claim 11,
   wherein generating the second Interest message involves including the query for the content name in the name or a payload of the second Interest message.

15. The storage medium of claim 11, wherein a respective entry of the next-hop table includes at least one of:
   a name or name prefix;
   a routable prefix for a key-resolution zone mapped to the name or name prefix; and
   a public key for a key-resolution service associated with the key-resolution zone.

16. The storage medium of claim 11, wherein obtaining the KRS record from the second key-resolution zone involves:
   generating a third Interest message whose name includes the routable prefix for the second key-resolution zone, and includes the query for the content name in the name or a payload of the third Interest; and
   responsive to disseminating the third Interest for the second key-resolution zone, receiving a Content Object that includes the KRS record.

17. The storage medium of claim 11, further comprising updating the next-hop table to include an entry that maps the content name to the routable prefix for the second key-resolution zone.

18. The storage medium of claim 11, further comprising:
   responsive to disseminating the second Interest for the key-resolution zone, receiving a Content Object that satisfies the second Interest, and includes the KRS record; and
   caching the final key-resolution record.

19. The storage medium of claim 11, wherein obtaining the KRS record involves:
   performing a longest-prefix-matching lookup in a KRS record repository, using the content name as input, to obtain the KRS record that includes the security information associated with at least a prefix of the content name.

20. A server computer of a key-resolution service (KSR), comprising:
   a processor; and
   a memory storing instructions that when executed by the processor cause the server computer to implement:
   a communication module configured to receive, over a Content Centric Network, an Interest message with a name that includes a routable prefix associated with the key-resolution service, wherein the Interest includes a query for a content name that is to be resolved in the name or a payload of the Interest;
   an Interest-processing module configured to obtain, from the Interest message, the content name that is to be resolved; and
   a record-lookup module configured to obtain a KRS record for the content name, wherein the KRS record includes security information for the content name or security information for a prefix of the content name, wherein obtaining the KRS record involves:
      performing a longest-prefix-matching lookup in a next-hop table, using the content name as input, to obtain a second routable prefix for a key-resolution zone associated with the content name or a prefix of the content name;
      disseminating, over the Content Centric Network, a second Interest message that includes the query for the content name, and whose name includes the second routable prefix for the key-resolution zone; and
      in response to receiving, from the key-resolution zone, a Content Object that includes a routable prefix for a second key-resolution zone, obtaining the KRS record from the second key-resolution zone; and
   wherein the communication module is further configured to return a Content Object whose payload includes the security information that satisfies the query, and whose name includes the Interest message's name, to satisfy the Interest message.

* * * * *